United States Patent
Orkiszewski et al.

(10) Patent No.: US 11,994,165 B2
(45) Date of Patent: May 28, 2024

(54) LUBRICANT SUPPLY SYSTEM

(71) Applicant: General Electric Company, Schenectady, NY (US)

(72) Inventors: Charles S. Orkiszewski, Cincinnati, OH (US); Weize Kang, Mason, OH (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 77 days.

(21) Appl. No.: 17/653,027

(22) Filed: Mar. 1, 2022

(65) Prior Publication Data
US 2023/0279902 A1    Sep. 7, 2023

(51) Int. Cl.
*F01D 25/16*      (2006.01)
*F16C 27/02*      (2006.01)
(Continued)

(52) U.S. Cl.
CPC .......... *F16C 27/045* (2013.01); *F01D 25/164* (2013.01); *F16C 27/02* (2013.01); *F16F 15/0237* (2013.01); *F16N 7/40* (2013.01); *F16N 31/00* (2013.01); *F05D 2220/32* (2013.01); *F05D 2240/50* (2013.01);
(Continued)

(58) Field of Classification Search
CPC .............. F01D 25/164; F05D 2240/50; F05D 2220/32; F16N 7/40; F16N 31/00; F16C 27/02; F16C 27/045; F16F 15/0234; F16F 2230/04; F16F 2230/24; F16F 2232/02
See application file for complete search history.

(56) References Cited

U.S. PATENT DOCUMENTS 3,206,109 A   9/1965   Paschk
3,704,049 A   11/1972  Guerrini
(Continued)

FOREIGN PATENT DOCUMENTS

EP   1375941 B1   1/2005
EP   3783204 A1   2/2021
(Continued)

OTHER PUBLICATIONS

Waukesha Bearings, "The Role of a Squeeze Film Damper," available at https://www.waukbearing.com/en/resources/bearing-knowledge/the-role-of-a-squeeze-film-damper.html, as viewed on Jan. 12, 2022.
(Continued)

*Primary Examiner* — Courtney D Heinle
*Assistant Examiner* — Theodore C Ribadeneyra
(74) *Attorney, Agent, or Firm* — Venable LLP; Michele V. Frank

(57) ABSTRACT

A lubricant supply system for a squeeze film damper. The lubricant supply system includes a fluid passage configured to supply a lubricant to the squeeze film damper of a bearing assembly. The fluid passage includes a first flow path for lubricant into the lubricant supply system and into the squeeze film damper of the bearing assembly and a second flow path for lubricant into the squeeze film damper of the bearing assembly. The lubricant supply system includes a valve assembly configured to allow the fluid passage to move from the first flow path to the second flow path in response to an interruption of the first flow path.

20 Claims, 9 Drawing Sheets

(51) Int. Cl.
*F16C 27/04* (2006.01)
*F16F 15/023* (2006.01)
*F16N 7/40* (2006.01)
*F16N 31/00* (2006.01)

(52) U.S. Cl.
CPC ....... *F16F 2230/04* (2013.01); *F16F 2230/24* (2013.01); *F16F 2232/02* (2013.01)

(56) References Cited

U.S. PATENT DOCUMENTS

| | | | | |
|---|---|---|---|---|
| 4,284,174 | A * | 8/1981 | Salvana | F16C 19/52 60/39.08 |
| 4,717,000 | A * | 1/1988 | Waddington | F16C 33/6662 384/473 |
| 4,976,335 | A * | 12/1990 | Cappellato | F16N 29/02 184/7.4 |
| 5,018,601 | A * | 5/1991 | Waddington | F16N 29/02 184/6.26 |
| 5,067,825 | A * | 11/1991 | Vance | F16F 15/0237 384/99 |
| 5,149,206 | A | 9/1992 | Bobo | |
| 5,215,384 | A * | 6/1993 | Maier | F16C 17/03 384/312 |
| 6,135,639 | A * | 10/2000 | Dede | F16C 27/045 384/99 |
| 7,387,189 | B2 * | 6/2008 | James | F01D 21/14 184/6.11 |
| 8,167,494 | B2 * | 5/2012 | Gibbons | F16C 27/045 384/99 |
| 8,191,686 | B2 * | 6/2012 | Galivel | F01M 9/04 60/39.08 |
| 8,230,835 | B2 * | 7/2012 | Gibson | F01M 1/12 184/104.1 |
| 8,887,869 | B2 | 11/2014 | Pisseloup | |
| 10,502,096 | B2 * | 12/2019 | Orkiszewski | F01D 25/18 |
| 10,731,559 | B2 * | 8/2020 | Teicholz | F01D 25/20 |
| 11,181,010 | B2 * | 11/2021 | Kostka | F01D 25/18 |
| 2010/0229823 | A1 * | 9/2010 | Gibson | F01M 1/12 123/196 R |
| 2016/0305284 | A1 * | 10/2016 | Mastro | F01D 25/20 |
| 2017/0138217 | A1 * | 5/2017 | Schwarz | G01N 15/1031 |
| 2018/0193770 | A1 * | 7/2018 | Czajkowski | B01D 19/0047 |
| 2020/0392866 | A1 | 12/2020 | Younes | |

FOREIGN PATENT DOCUMENTS

| | | |
|---|---|---|
| FR | 3127024 A1 | 3/2023 |
| FR | 3127025 A1 | 3/2023 |
| GB | 1301282 A | 12/1972 |

OTHER PUBLICATIONS

Notes 13: Squeeze Film Dampers: Operation, Models & Issues—© Dr. Luis San Andres (2010), p. 1-22.

* cited by examiner

LUBRICANT SUPPLY SYSTEM

TECHNICAL FIELD

The present disclosure relates to a lubricant supply system. In particular, the present disclosure relates to a lubricant supply system for a gas turbine engine.

BACKGROUND

Turbomachinery rotors depend on a squeeze film damper (SFD) at one or more bearing locations to provide the damping necessary to control a dynamic response within the turbomachinery. The squeeze film damper is formed of a lubricant located within a space between a bearing outer race and a damper housing. Squeeze film dampers are created by adding a thin layer of lubricant, such as oil, around the outer race of a rotor bearing. The outer race squeezes the lubricant into a pressure bulge ahead of the vibration orbit, thereby creating damping. Squeeze film dampers are used to decrease vibrations resulting from rotor unbalance and other vibration sources and to stabilize the rotor.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, or structurally similar elements.

DETAILED DESCRIPTION

Features, advantages, and embodiments of the present disclosure are set forth or apparent from a consideration of the following detailed description, drawings, and claims. Moreover, it is to be understood that the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

The present disclosure relates to a lubricant supply system that enables lubricant to be provided to bearing assembly, such as, for example, to a squeeze film damper of the bearing assembly. The present disclosure also relates to a lubricant retention and supply system that enables retention of a lubricant within a lubricant system, such as a squeeze film damper. The present disclosure further relates to a lubricant system operable during a loss or reduction of a lubricant supply. Typically, a squeeze film damper is provided by a continuous and constant flow of lubricant to a space between the outer race of a bearing and a damper housing. The technical effect of the present disclosure provides, enables, or otherwise allows for the continuous and constant flow of lubricant. Another technical effect of the present disclosure provides, enables, or otherwise allows for a system that maintains lubricant in the squeeze film damper, at least temporarily, when the continuous flow is interrupted or stopped, referred to herein as a lubricant interruption condition. The present disclosure thus prevents and/or mitigates the loss of the lubricant to the squeeze film damper, which may result in mitigating or preventing an increased vibration response, rubbing, instability, or other damage caused by operation of the bearing assembly with an ineffective squeeze film damper.

In some examples, the lubricant retention and supply system of the present disclosure may prevent lubricant from leaving the squeeze film damper during a lubricant interruption condition. In some examples, the lubricant retention and supply system may provide a closed loop flow passage to allow the lubricant to be recirculated through the squeeze film damper in conditions of lubricant interruption condition. In some examples, the lubricant retention and supply system may provide a reservoir that is filled with lubricant during the flow of the lubricant and provides the stored lubricant to the squeeze film damper during a lubricant interruption condition. In some examples, the lubricant provided to the squeeze film damper during a lubricant interruption condition may be pressurized.

Figure 1:
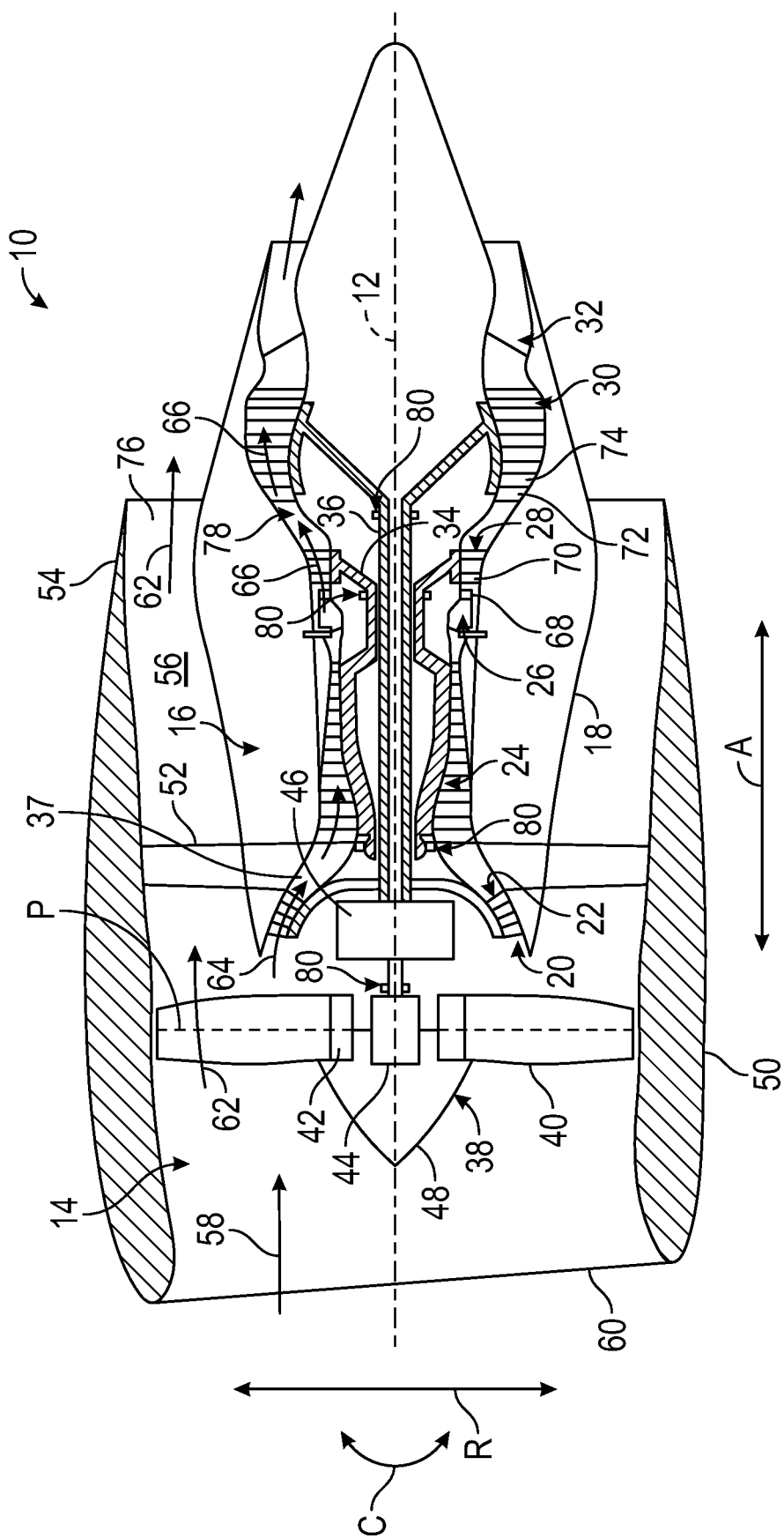
FIG. 1 shows a schematic, cross section view of a gas turbine engine, taken along a centerline of the gas turbine engine, according to an embodiment of the present disclosure.

FIG. 1 shows a schematic cross-sectional view of a gas turbine engine 10. The gas turbine engine 10 defines an axial direction A extending parallel to a longitudinal axis 12 of the gas turbine engine 10, a radial direction R, and a circumferential direction C extending about the axial direction A. The gas turbine engine 10 includes a fan section 14 and a core turbine engine 16 disposed downstream from the fan section 14.

The core turbine engine 16 depicted includes an outer casing 18 that defines an annular inlet 20. The core turbine engine 16 includes, in serial flow relationship, a compressor section including a low pressure (LP) compressor 22 and a high pressure (HP) compressor 24, a combustion section 26, a turbine section including a high pressure (HP) turbine 28 and a low pressure (LP) turbine 30, and a jet exhaust nozzle section 32. A high pressure (HP) shaft 34 drivingly connects the HP turbine 28 to the HP compressor 24. A low pressure (LP) shaft 36 drivingly connects the LP turbine 30 to the LP compressor 22. Accordingly, the LP shaft 36 and the HP shaft 34 are each rotary components, rotating about the longitudinal axis 12 in the circumferential direction C during operation of the gas turbine engine 10.

In order to support such rotary components, the gas turbine engine includes a plurality of bearing assemblies 80 attached to various structural components within the gas turbine engine 10. For example, the bearing assemblies 80 may be located to facilitate rotation of the LP shaft 36 and the HP shaft 34. The bearing assemblies 80 may additionally, or alternatively, be located at any desired location along the LP shaft 36 and the HP shaft 34. The bearing assemblies 80 may be used in combination with oil-lubricated bearing assemblies, as will be discussed in more detail herein.

Referring still to FIG. 1, the fan section 14 includes a fan 38 having a plurality of fan blades 40 coupled to a disk 42 in a spaced apart manner. The disk 42 is covered by a hub 48. As depicted, the fan blades 40 extend radially outwardly from the disk 42 generally along the radial direction R. Each fan blade 40 is rotatable relative to the disk 42 about a pitch axis P by virtue of the fan blades 40 being operatively coupled to a pitch change mechanism 44. The fan blades 40, the disk 42, and the pitch change mechanism 44 are together rotatable about the longitudinal axis 12 by the LP shaft 36 across a power gearbox 46. The power gearbox 46 includes a plurality of gears for adjusting the rotational speed of the fan 38 relative to the LP shaft 36. More particularly, the fan section includes a fan shaft rotatable by the LP shaft 36 across the power gearbox 46. Accordingly, the fan shaft may also be considered to be a rotary component, and is similarly supported by a bearing assembly 80.

The fan section 14 includes an annular fan casing or outer nacelle 50 that circumferentially surrounds the fan 38 and/or at least a portion of the core turbine engine 16. The outer nacelle 50 is supported relative to the core turbine engine 16 by a plurality of circumferentially-spaced outlet guide vanes 52. A downstream section 54 of the outer nacelle 50 extends over an outer portion of the core turbine engine 16 so as to define a bypass airflow passage 56 therebetween.

During operation of the gas turbine engine 10, a volume of air 58 enters the gas turbine engine 10 through an inlet 60 of the outer nacelle 50 and/or the fan section 14. As the volume of air 58 passes across the fan blades 40, a first portion of the air 62 of the air 58 is directed or routed into the bypass airflow passage 56 and a second portion of air 64 of the air 58 is directed or routed into the core air flowpath 37, or, more specifically, into the LP compressor 22. The ratio between the first portion of air 62 and the second portion of air 64 is known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and the HP turbine rotor blades 70 that are coupled to the HP shaft 34, thus, causing the HP shaft 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus, causing the LP shaft 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before the first portion of air 62 is exhausted from a fan nozzle exhaust section 76 of the gas turbine engine 10, also providing propulsive thrust. The HP turbine 28, the LP turbine 30, and the jet exhaust nozzle section 32 at least partially define a hot gas path 78 for routing the combustion gases 66 through the core turbine engine 16.

Although depicted and described in conjunction with the gas turbine engine 10 of FIG. 1, aspects of the present disclosure may be incorporated into any other suitable gas turbine engine. For example, in other exemplary embodiments, aspects of the present disclosure may be incorporated into, e.g., a turbo fan engine (e.g., similar to the gas turbine engine 10 of FIG. 1), a turboprop engine, a turboshaft engine, or a turbojet engine. Further, in still other embodiments, aspects of the present disclosure may be incorporated into any other suitable turbomachine, including, without limitation, a steam turbine, a centrifugal compressor, a turbocharger, stationary turbomachinery, or other power generation turbomachines, or any type of rotating equipment using squeeze film dampers.

Figure 2:
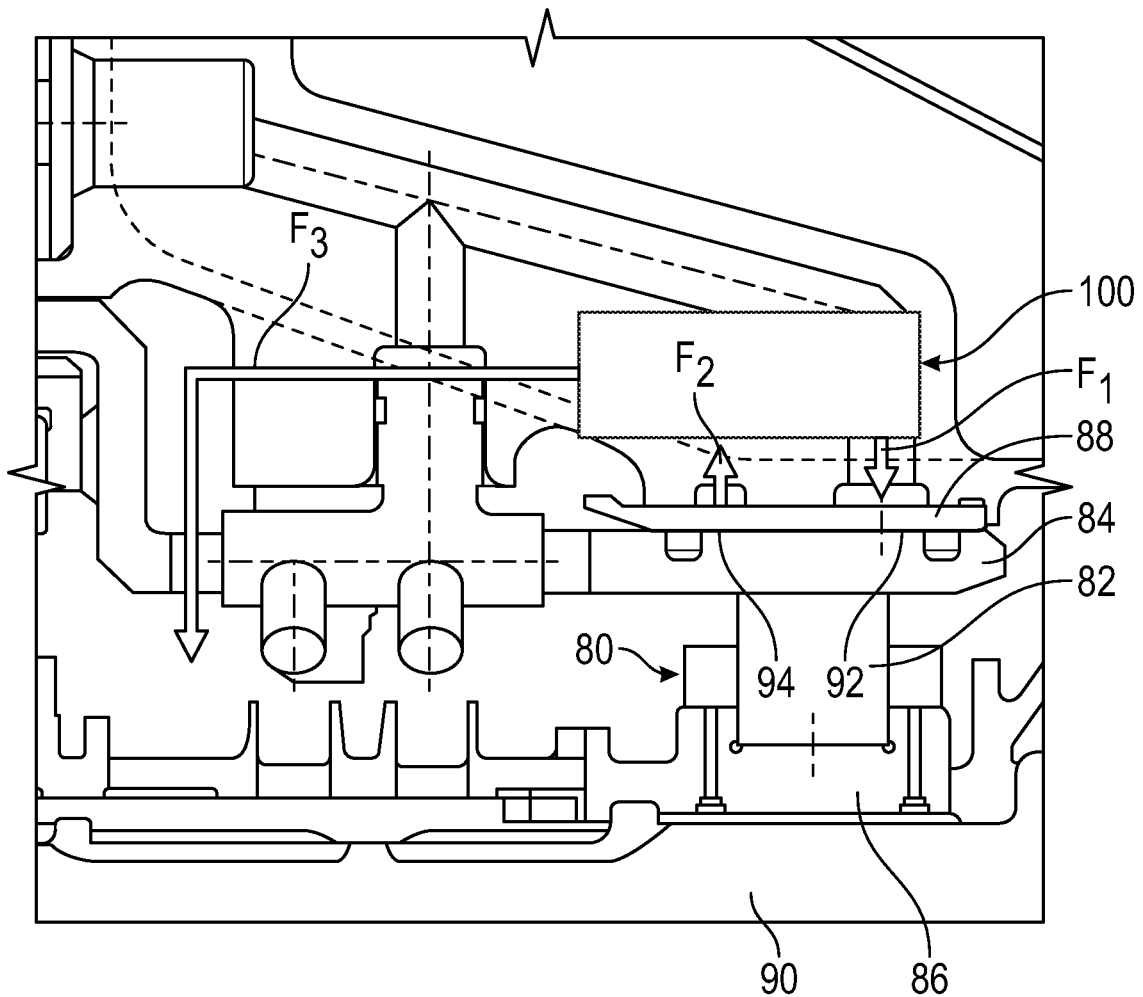
FIG. 2 shows a schematic, enlarged view, of a bearing assembly of the gas turbine engine of FIG. 1, according to an embodiment of the present disclosure.

Referring to FIG. 2, the bearing assembly 80 may be provided in conjunction with a lubrication system 100, which may be one of the lubricant retention and supply systems described herein with respect to FIGS. 3 to 9. The bearing assembly 80 includes an inner race 86, a roller element bearing 82, and an outer race 84. The roller element bearing 82 may be, for example, but not limited to, one or more roller bearings, ball bearings, spherical roller bearings, tapered roller bearings, etc. The bearing assembly 80 is arranged around a shaft 90, which may be the HP shaft 34 and/or the LP shaft 36 described with respect to FIG. 1. A damper housing 88 may be provided to allow for a squeeze film damper to be located in the space 92 between the outer race 84 and the damper housing 88. While aspects of the disclosure are described with respect to a bearing assembly 80 and related components of the engine, aspects of the disclosure can be equally applicable in any bearing assembly, lubricant, or lubrication supply system, or the like.

The lubrication system 100 may provide, enable, or allow for a flow $F_1$ of lubricant to the bearing assembly 80. In particular, the lubrication system 100 may provide a flow $F_1$ of lubricant to the space 92 to provide a squeeze film damper in between the outer race 84 and the damper housing 88. The lubricant may exit the space 92 via flow $F_2$. The lubricant may re-enter the lubrication system 100. In some examples of the present disclosure, the lubricant may exit the lubrication system 100 via flow $F_3$ and/or may be recirculated through the lubrication system 100 to again be provided to the bearing assembly 80.

Figure 3:
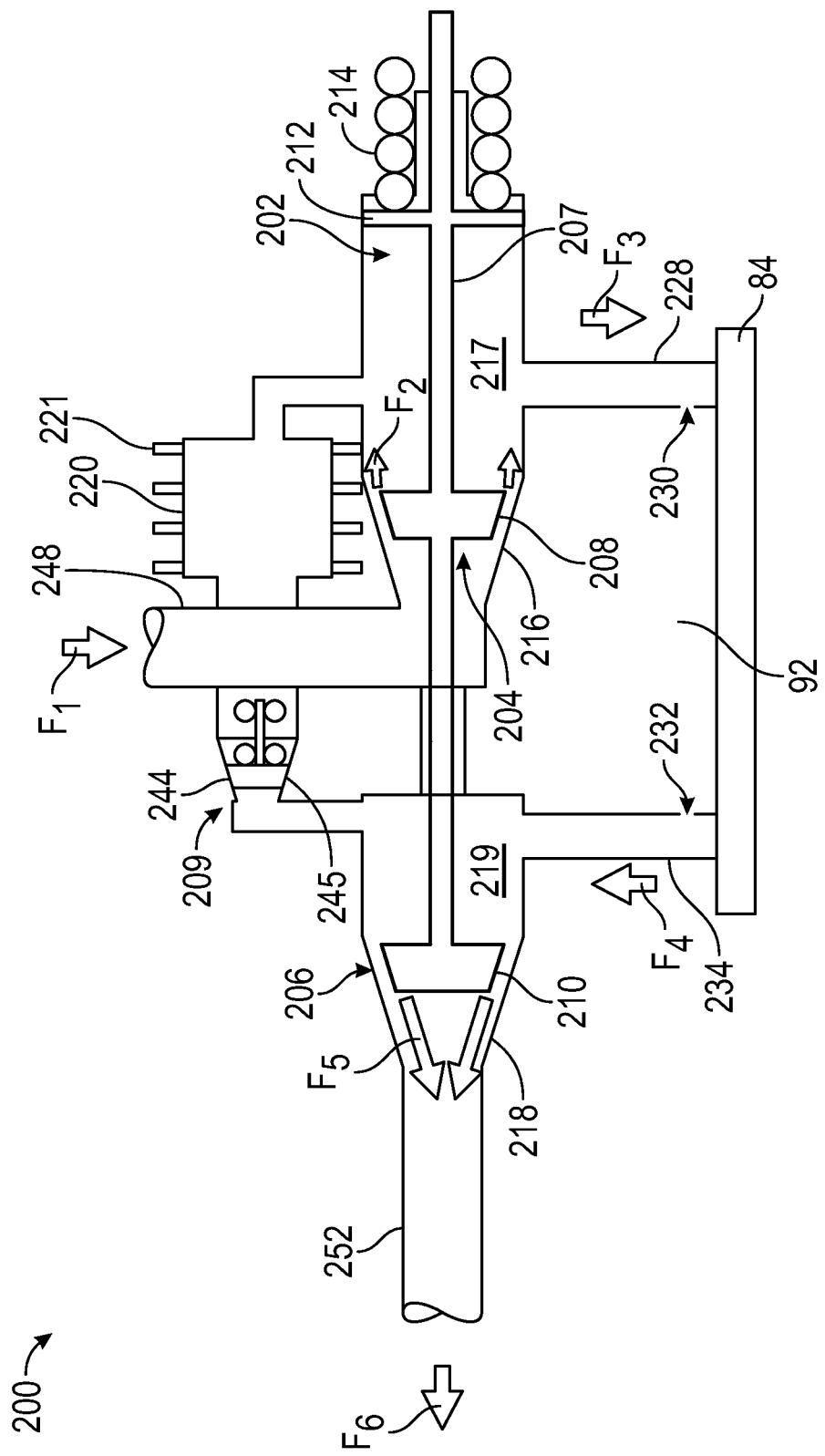
FIG. 3 shows a schematic view of a lubricant supply system, with a valve assembly of the lubricant supply system in an open position, according to an embodiment of the present disclosure.
Figure 4:
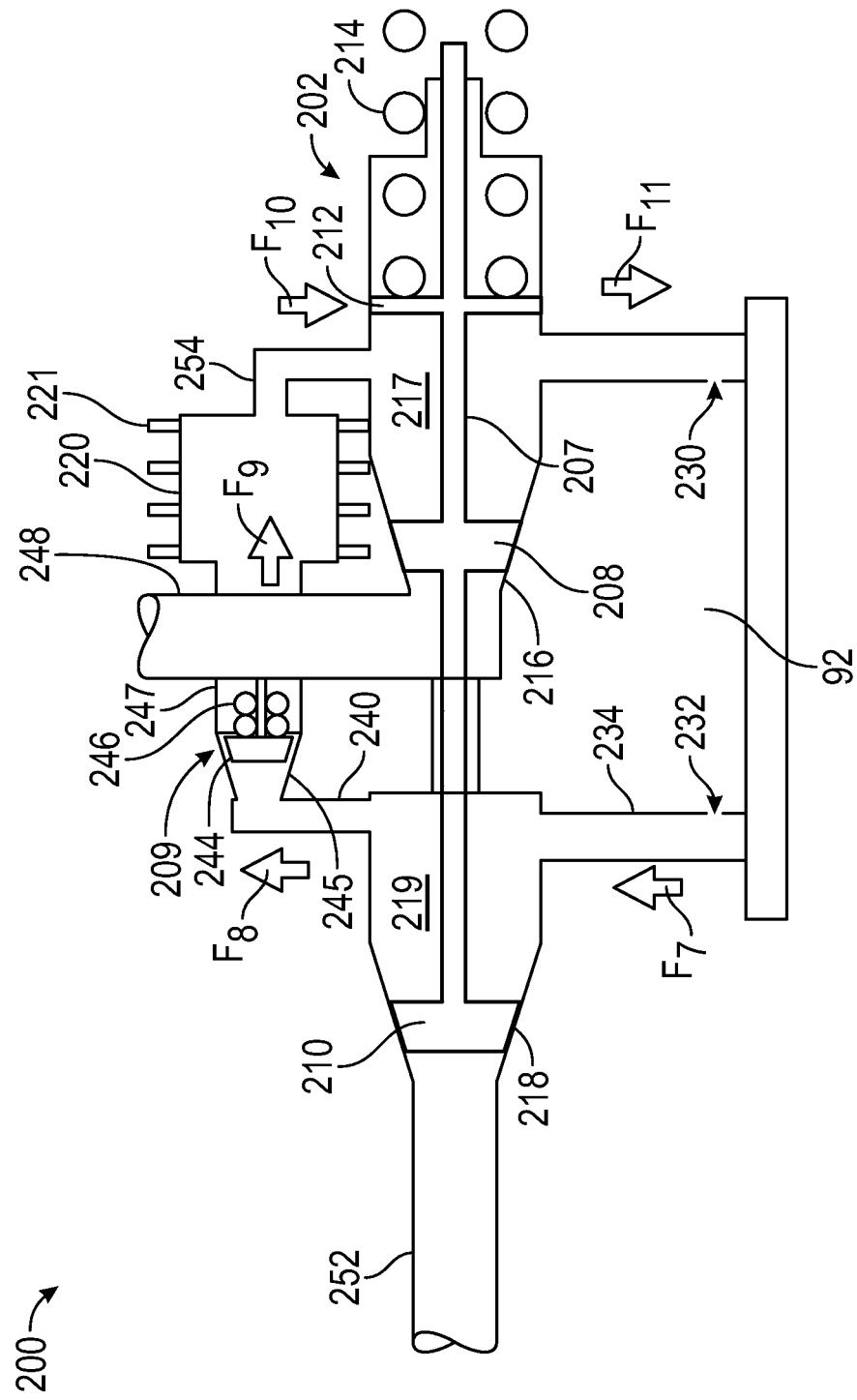
FIG. 4 shows a schematic view of the lubricant supply system of FIG. 3, with the valve assembly of the lubricant supply system in a closed position, according to an embodiment of the present disclosure.

Referring to FIGS. 3 and 4, the lubrication system 100 described with respect to FIG. 2 may be a lubricant retention and supply system 200. FIG. 3 illustrates the lubricant retention and supply system 200 when the lubricant is supplied to the squeeze film damper (e.g., the space 92). FIG. 4 illustrates the lubricant retention and supply system 200 during a lubricant interruption condition. The lubricant retention and supply system 200 of FIGS. 3 and 4 provides an open flow path or a first flow path for lubricant to flow through the squeeze film damper during lubricant supply conditions and a closed flow path or a second flow path for lubricant to recirculate through the squeeze film damper during a lubricant interruption condition. As shown in FIG. 3, the first flow path is defined by flows $F_1$, $F_2$, $F_3$, $F_4$, $F_5$, and $F_6$. As shown in FIG. 4, the second flow path is defined by flows $F_7$, $F_8$, $F_9$, $F_{10}$, and $F_{11}$.

With continued reference to FIGS. 3 and 4, the lubricant retention and supply system 200 includes a valve assembly 202. The valve assembly 202 includes a first valve 204 and a second valve 206. The first valve 204 and the second valve 206 are attached to or connected to a common valve stem 207. The first valve 204 includes a valve member 208 configured to interface with a valve seat 216. The second valve 206 includes a valve member 210 configured to interface with a valve seat 218. A biasing member 214, such as a spring in one non-limiting example, is provided to bias the valve assembly 202 into a closed position (FIG. 4). The biasing member 214 may interface with a piston head 212, in a manner to be described herein. The lubricant retention and supply system 200 can optionally include a reservoir 220. The reservoir 220 may optionally include a heat sink 221. The lubricant retention and supply system 200 includes a third valve 209. The third valve 209 includes a valve member 244 configured to interface with a valve seat 245. The third valve 209 may be a stop valve and/or check valve allowing one-directional flow.

Non-limiting aspects of the disclosure can be included wherein the lubricant retention and supply system 200 is operable, such that during operation, and referring to FIG. 3, a lubricant is provided from a main lubricant supply (not shown) via flow $F_1$ to a passage 248 of the lubricant retention and supply system 200. The flow $F_1$ provides a force that operably counteracts the biasing member 214 to move the first valve 204 to an open position. The flow of lubricant operably flows past the first valve 204 at $F_2$ and into a first chamber 217 of the valve assembly 202. The flow then operably flows at $F_3$ to passage 228, through an opening 230, and into the space 92 between the outer race 84 and the damper housing 88 (FIG. 2). Although the damper housing 88 is not shown in FIG. 3 to enhance clarity of the lubricant retention and supply system 200, it may be appreciated that the lubricant retention and supply system 200 may be embodied within the damper housing 88 and/or may be provided in a separate housing that is fluidly coupled and attached to the damper housing 88. The lubricant can be operably provided as a continuous flow through the space 92 and, thus, exits through opening 232 to passage 234 at flow $F_4$. The flow $F_4$ operably moves into a second chamber 219 of the valve assembly 202. The force of flow $F_1$ operably moves the second valve 206 to the open position in conjunction with the first valve 204, due to their common connectivity to the valve stem 207. Thus, the lubricant operably flows at $F_5$ past the valve member 210 and exits the lubricant retention and supply system 200 through the passage 252 at flow $F_6$.

If the operably flow $F_1$ of lubricant through passage 248 is interrupted, reduced, inhibited, or stopped, and referring now to FIG. 4, the operably force acting against the valve member 208 ceases. The biasing member 214 then operably pushes against the piston head 212 to move the valve assembly 202 to the closed position. In the closed position, the valve member 208 is fitted within the valve seat 216 and the valve member 210 is fitted within the valve seat 218. Lubricant that was operably present in the lubricant retention and supply system 200 when the valve assembly 202 was open is now operably trapped within the lubricant retention and supply system 200 and is unable to or inhibited from exiting the system through the passage 252. The lubricant may be operably recirculated throughout the now closed lubricant retention and supply system 200 by way of the closed circuit shown in FIG. 4. For example, the lubricant operably present in the space 92 may exit the space through opening 232 and operably flow through passage 234 at flow $F_7$. The lubricant flows through second chamber 219 and operably into passage 240 at flow $F_8$. The force of flow $F_8$ operably acts against the valve member 244 of the third valve 209. This force operably acts against the biasing force of the biasing member 246 that holds the third valve 209 in a normally closed position (FIG. 3). The flow $F_8$ operably unseats the valve member 244 from the valve seat 245 and allows the lubricant to flow through a passage 247 and into the reservoir 220 at $F_9$. The heat sink 221 located within the reservoir 220 operably removes heat from the lubricant. The lubricant then operably flows from the reservoir 220 through passage 254 and into the first chamber 217 at flow $F_{10}$. From the first chamber 217, the lubricant flows at flow $F_{11}$ into the passage 228, through the opening 230, and back into the space 92. The recirculation then continues through the closed circuit as previously described.

In other words, FIG. 3 represents a state in which a main valve (e.g., valve 202) is open and a stop valve (e.g., valve 209) is closed. This operably allows lubricant to flow in the squeeze film damper and out of the squeeze film damper by way of the first flow path. FIG. 4 represents a state in which the main valve (e.g., valve 202) is closed and the stop valve (e.g., valve 209) is open. This allows lubricant to operably recirculate within the closed flow passage and prevents lubricant from exiting the closed flow passage (e.g., prevents lubricant from exiting through passage 252) by way of the second flow path. During operable continued recirculation of the lubricant, the lubricant may heat up, which may reduce the viscosity of the lubricant rendering it with lower damper effectiveness. Accordingly, the heat sink 221 (also referred to as a heat exchanger), may operably reduce the temperature in the recirculated lubricant, thus maintaining the viscosity. The lubricant is prevented from leaving the closed circuit, also referred to as the damper circuit, when the input supply through passage 248 is interrupted or stopped. That is, a separate circuit, formed of a passage 254, a passage 228, a passage 234, a passage 240, and a reservoir 220 is provided to allow recirculation of a cooled flow of lubricant within the squeeze film damper when the input supply is interrupted or stopped. As described with respect to FIG. 5, the recirculation is driven by the eccentric orbit of the rotor.

Figure 5:
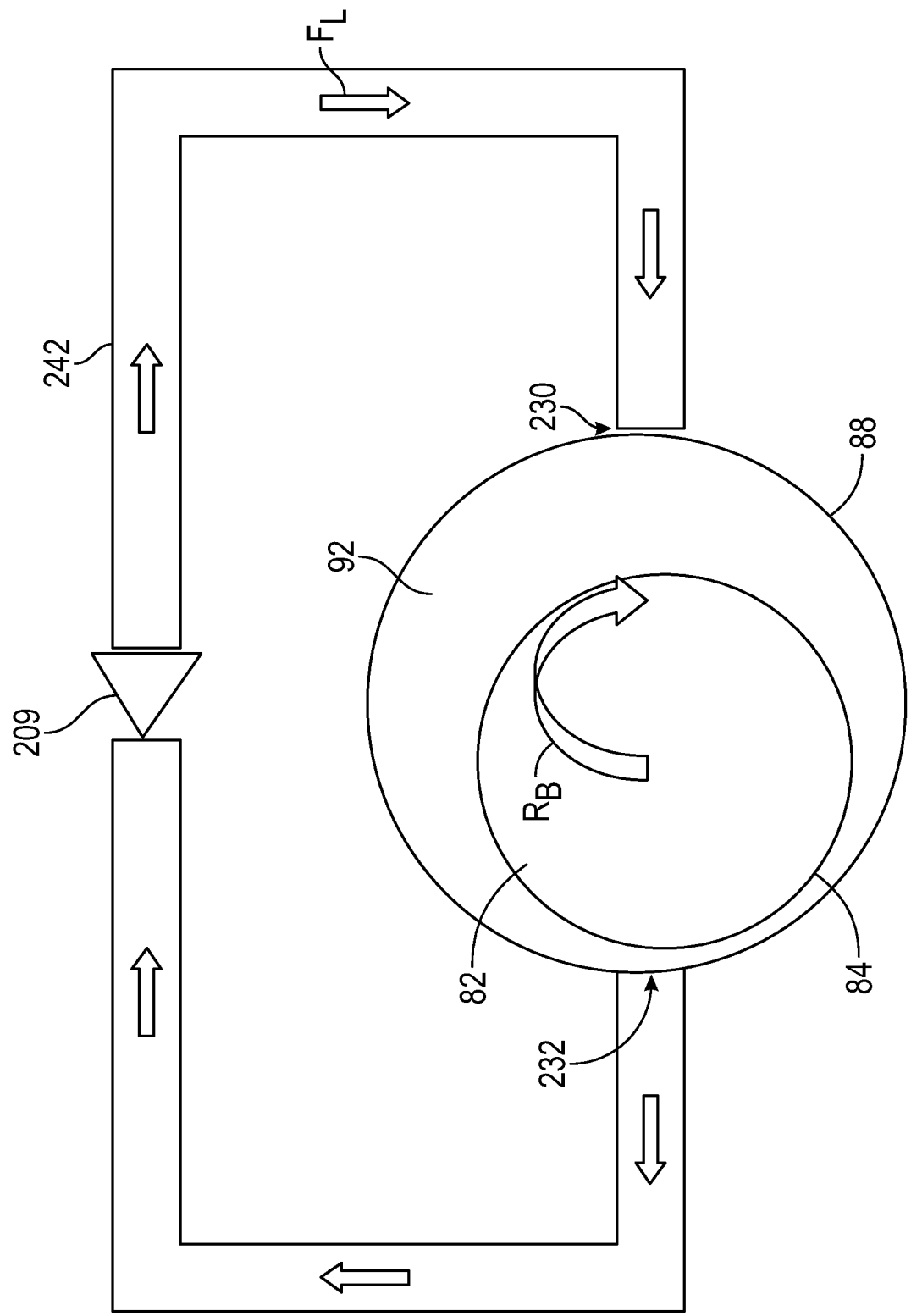
FIG. 5 shows a schematic view of a flow path of the lubricant supply system of FIG. 4, according to an embodiment of the present disclosure.

FIG. 5 illustrates a schematic view of a recirculation path 242 of an operable lubricant flow $F_L$ in the lubricant retention and supply system 200, when the valve assembly 202 is in the closed position. The recirculation path 242 may include the passage 254, the first chamber 217, the passage 228, the space 92, the passage 234, the second chamber 219, the passage 240, the passage 247, and the reservoir 220, all shown and described with respect to FIGS. 3 and 4. This path is shown simplified in FIG. 5 to facilitate discussion of the motive force for the recirculation of the lubricant flow $F_L$. As mentioned, the recirculation path 242 includes the space 92. The space 92 is defined between an outer surface of the outer race 84 and an inner surface of the damper housing 88. During operation, the roller element bearing 82 rotates within the space 92 in a direction $R_B$. The rotation of the roller element bearing 82 causes the lubricant present in the space 92 to be moved or pumped into the recirculation path via the opening 232. The rotation of the roller element bearing 82 operably causes the lubricant to flow through the recirculation path 242 and to re-enter the space 92 through the opening 230. The third valve 209 operates as a check valve to ensure one way flow of the lubricant flow $F_L$. Although shown and described with respect to FIG. 4, the roller element bearing 82 may be the motive force for lubricant flow in other lubricant retention and supply systems described herein, such as, for example, those shown in FIGS. 6 to 9.

In other words, the roller element bearing 82 operably drives the recirculation of the lubricant in the recirculation path 242 by the eccentric orbit of the rotor (e.g., the roller element bearing 82). The recirculation path 242 may be a closed path that prevents lubricant from exiting the lubricant retention and supply system. In some examples, the damper lubricant inlet (e.g., opening 230) and the damper lubricant outlet (e.g., opening 232) are separated around the damper housing 88 by a predetermined angle. In FIG. 5, the separation depicted is 180°. Other angles are contemplated, however, as so long as the opening 230 and the opening 232 are not provided at the same location of the damper housing 88.

Figure 6:
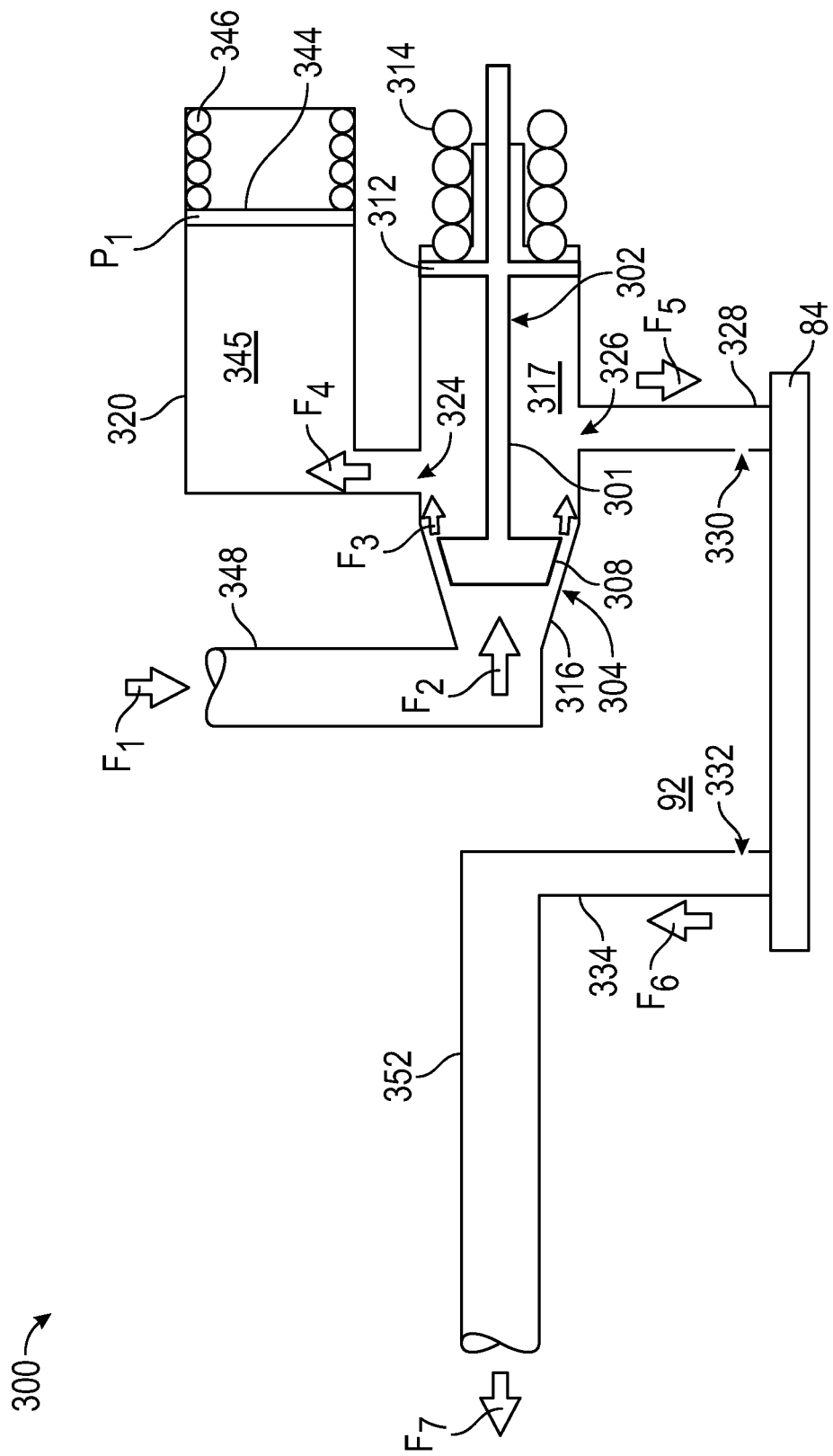
FIG. 6 shows a schematic view of a lubricant supply system, with a valve assembly of the lubricant system in an open position, according to an embodiment of the present disclosure.
Figure 7:
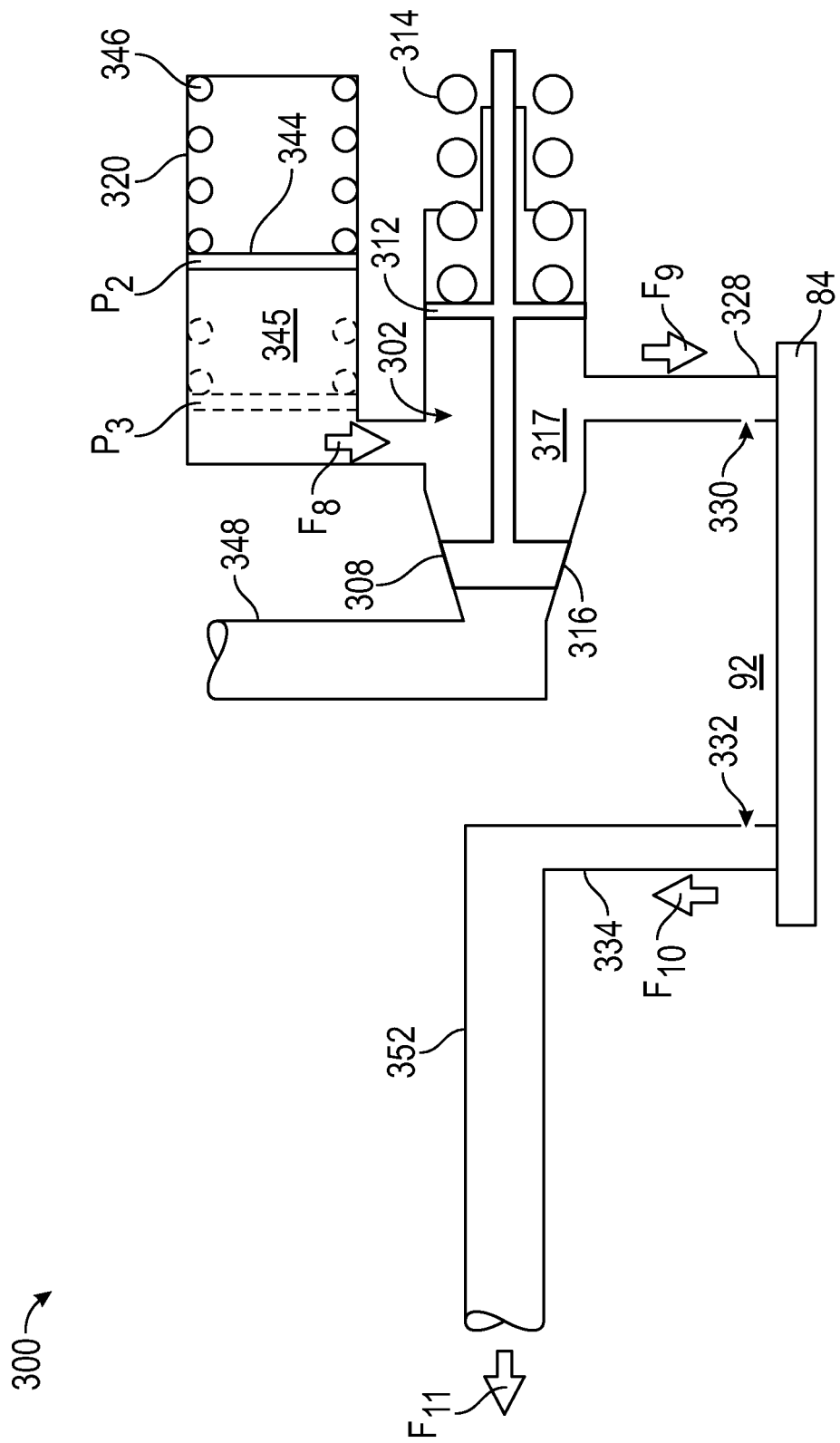
FIG. 7 shows a schematic view of the lubricant supply system of FIG. 6, with the valve assembly of the lubricant supply system in a closed position, according to an embodiment of the present disclosure.

Referring to FIGS. 6 and 7, the lubrication system 100 described with respect to FIG. 2 may be a lubricant retention and supply system 300. The lubricant retention and supply system 300 includes a valve assembly 302. The valve assembly 302 includes a valve 304, which may be referred to as a first valve 304. The first valve 304 is connected to a piston head 312 via a valve stem 307. The first valve 304 includes a valve member 308 configured to interface with a valve seat 316. A biasing member, referred to herein as a first biasing member 314, is provided to bias the valve assembly 302 into a closed position (FIG. 7). The first biasing member 314 may interface with the piston head 312, in a manner to be described herein. The lubricant retention and supply system 300 includes a reservoir 320. The reservoir 320 may include a piston 344 and a second biasing member 346. The second biasing member 346 may be a device to provide a restoration force, such as, for example, a compression spring. As shown in FIG. 6, the first flow path is defined by flows $F_1$, $F_2$, $F_3$, $F_4$, $F_5$, $F_6$, and $F_7$. As shown in FIG. 7, the second flow path is defined by flows $F_8$, $F_9$, $F_{10}$, and $F_{11}$.

During operation, and referring to FIG. 6, a lubricant is provided via flow $F_1$ to a passage 348 of the lubricant retention and supply system 300 toward the first valve 304 at $F_2$. The flow at $F_2$ operably provides a force that counteracts the first biasing member 314 to move the first valve 304 to an open position. The flow of lubricant operably flows past the first valve 304 at $F_3$ and into a first chamber 317 of the valve assembly 302. The flow then splits with a first portion of the flow at $F_4$ flowing to a second chamber 345 via an opening 324 and a second portion of the flow at $F_5$ flowing into a passage 328 via an opening 326 and, then, through passage 328 and into the space 92 between the outer race 84 and the damper housing 88 (FIG. 2) via an opening 330. Although the damper housing 88 is not shown in FIG. 6 to enhance clarity of the lubricant retention and supply system 300, the lubricant retention and supply system 300 may be embodied within the damper housing 88 and/or may be provided in a separate housing that is fluidly coupled and attached to the damper housing 88. The lubricant is operably provided as a continuous flow through the space 92 and, thus, exits through opening 332 to passage 334 at flow $F_6$. The lubricant flows at $F_7$ to exit the lubricant retention and supply system 300 through the passage 352.

During operation, and when the valve assembly 302 is in the open position, lubricant is collected in the second chamber 345 of the reservoir 320 via the flow $F_4$ from the first chamber 317. As the lubricant collects, the force of the lubricant within the reservoir 320 acts against the piston 344 and against the second biasing member 346. The collected lubricant will continue to fill the reservoir 320 until the second biasing member 346 is a fully compressed position and the piston 344 is at a full reservoir position $P_1$. In this manner, during flow $F_1$ of the lubricant, a supply of lubricant may also be stored within the reservoir 320, in addition to being provided to the space 92.

If the operably flow $F_1$ of lubricant through the passage 348 is interrupted, reduced, inhibited, or stopped, and referring now to FIG. 7, the force acting against the valve member 308 ceases. The first biasing member 314 then operably pushes against the piston head 312 to move the valve assembly 302 to the closed position. In the closed position, the valve member 308 is fitted within the valve seat 316. With no flow through the passage 348, lubricant present in the space 92 will operably exit the lubricant retention and supply system 300 via the passage 352. The lubricant that collected in the second chamber 345 during flow $F_1$ (FIG. 6) of lubricant through the passage 348 may now flow through the space 92. With no force of fluid from flow $F_4$ acting against the piston 344, the second biasing member 346 may move the piston 344 within the second chamber 345 to push the lubricant stored in the reservoir 320 into the first chamber 317 (as shown via flow $F_8$). The second biasing member 346 will move the piston 344 along the second chamber 345 from the first position $P_1$ (FIG. 6), to an intermediate position $P_2$, where a portion of the lubricant stored in the reservoir 320 has been evacuated, to a final position $P_3$, where all lubricant stored in the reservoir 320 has been evacuated. The lubricant operably flows from the first chamber 317, through the passage 328 at flow $F_9$ and into the space 92 via the opening 330. The lubricant exits the space 92 through opening 332 and flows through passage 334 at flow $F_{10}$. The lubricant then flows out of the lubrication retention and supply system 300 at flow $F_{11}$ via the passage 352. As the reservoir 345 has a finite space for which to store lubricant during the open operating position of FIG. 6, the supply of lubricant to the space 92 when the valve assembly 302 is in the closed position of FIG. 7 is temporary. Once all of the lubricant has operably evacuated from the reservoir 320 and the piston is in the position $P_3$, no further lubricant will be supplied to the space 92.

In other words, the lubricant retention and supply system of FIGS. 6 and 7 provides a system for operably supplying pressurized lubricant from a reservoir (e.g., reservoir 320) during a lubricant interruption condition (e.g., FIG. 7). In FIG. 6, lubricant is operably supplied to passage 348. The main valve (e.g., valve 302) is open and lubricant operably flows to the squeeze film damper (e.g., space 92) and to the reservoir (e.g., reservoir 320). In FIG. 7, lubricant is stopped or interrupted from supply to passage 348. The main valve (e.g., valve 302) is closed and lubricant flows from the reservoir (e.g., reservoir 320) to the squeeze film damper (e.g., space 92). During operation, the lubricant reservoir (e.g., reservoir 320) is filled and the spring 346 and the piston 344 operate as a pressurizer that is loaded by the oil supply pressure during the operating condition of FIG. 6. During a lubricant interruption condition (e.g., FIG. 7), the lubricant in the reservoir 320 is released to the squeeze film damper. The lubricant pressure is maintained by the spring 346 and the piston 344 for the period of the lubricant interruption. The reservoir 320 may be sized to the duration of the lubricant interruption condition. That is, the reservoir 320 may be sized such that there is lubricant to provide to the squeeze film damper for the entirety of the lubricant interruption condition.

Although not shown, in some examples, a constriction may be provided in the passage between the opening 324 and the reservoir 320. The constriction may slow the rate at which lubricant flows from the reservoir 320 to the squeeze film damper space 92 in the lubricant interruption condition of FIG. 7. This may prolong use of the bearing assembly with the squeeze film damper by slowly flowing the lubricant into the space 92, thus, lengthening the use of the lubricant supply in the reservoir 320.

Figure 8:
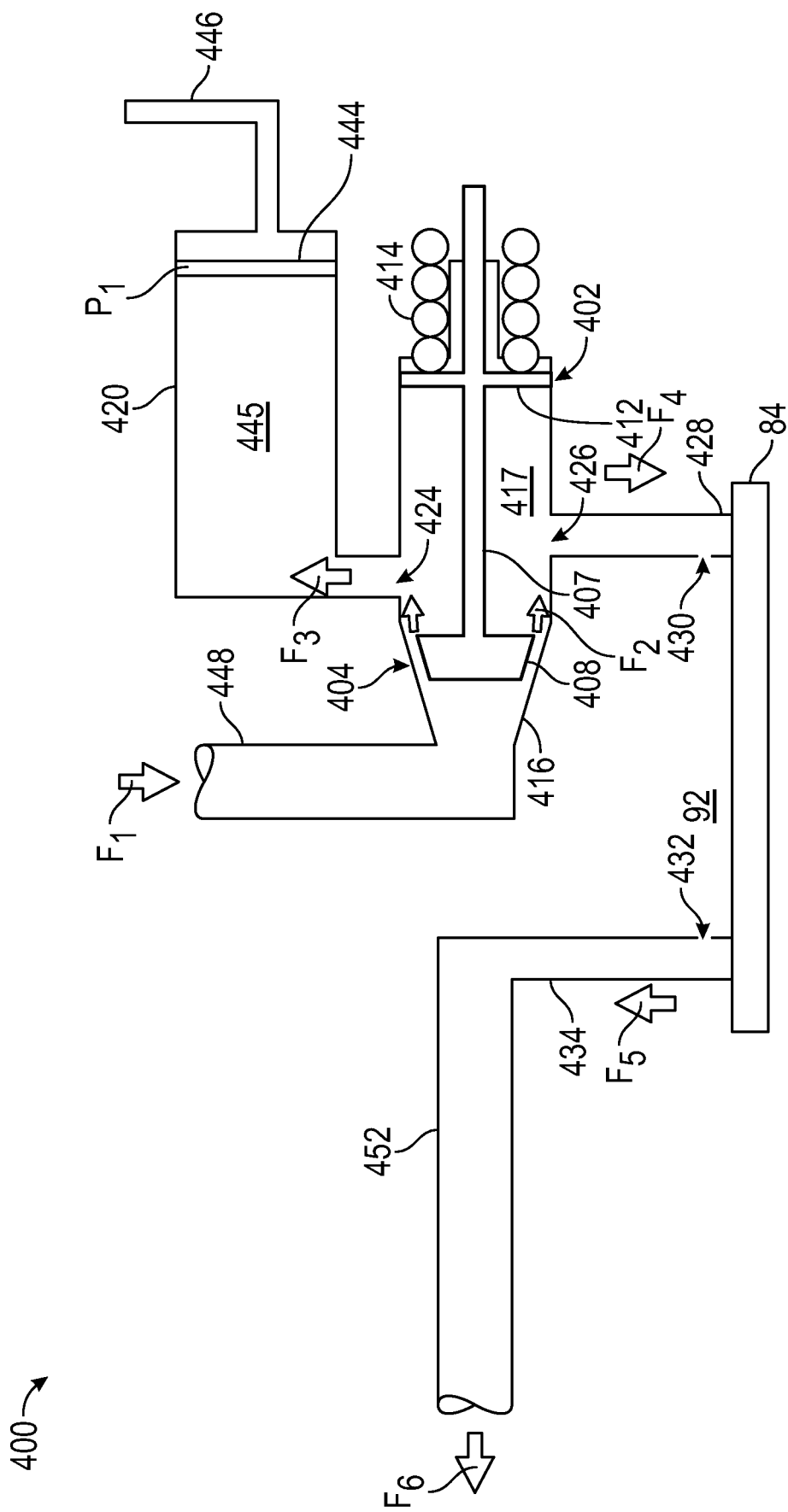
FIG. 8 shows a schematic view of a lubricant supply system, with a valve assembly of the lubricant supply system in an open position, according to an embodiment of the present disclosure.
Figure 9:
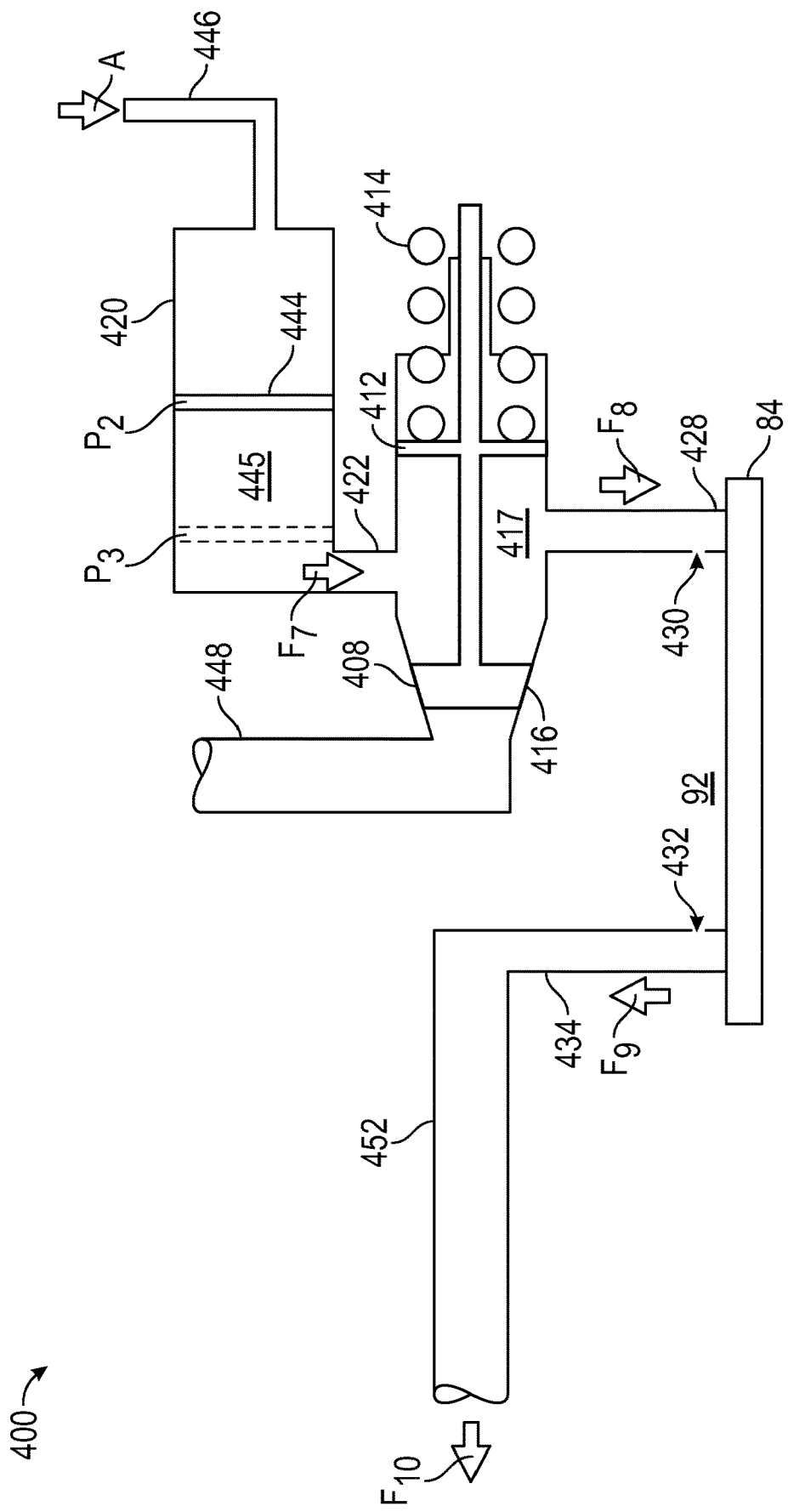
FIG. 9 shows a schematic view of the lubricant supply system of FIG. 8, with the valve assembly of the lubricant supply system in a closed position, according to an embodiment of the present disclosure.

Referring to FIGS. 8 and 9, the lubrication system 100 described with respect to FIG. 2 may be a lubricant retention and supply system 400. The lubricant retention and supply system 400 includes a valve assembly 402. The valve assembly 402 includes a valve 404, which may be referred to as a first valve 404. The first valve 404 is connected to a piston head 412 via a valve stem 407. The first valve 404 includes a valve member 408 configured to interface with a valve seat 416. A biasing member, referred to herein as a first biasing member 414 is provided to bias the valve assembly 402 into a closed position (FIG. 9). The first biasing member 414 may interface with the piston head 412, in a manner to be described herein. The lubricant retention and supply system 400 includes a reservoir 420. The reservoir 420 may include a piston 444 and a second biasing member 446. The second biasing member 446 may be a supply of pressurized fluid that is selectively provided to the reservoir 420. As shown in FIG. 8, the first flow path is defined by flows $F_1$, $F_2$, $F_3$, $F_4$, $F_5$, and $F_6$. As shown in FIG. 9, the second flow path is defined by flows $F_7$, $F_8$, $F_9$, and $F_{10}$.

During operation, and referring to FIG. 8, a lubricant is provided via flow $F_1$ to a passage 448 of the lubricant retention and supply system 400 toward the first valve 404. The flow provides a force that counteracts the first biasing member 414 to move the first valve 404 to an open position. The flow of lubricant flows past the first valve 404 at $F_2$ and into a first chamber 417 of the valve assembly 402. The flow then splits with a first portion of the flow at $F_3$ flowing to a second chamber 445 via an opening 424 and a second portion of the flow at $F_4$ flowing into a passage 428 via an opening 426 and, then, through passage 428 and into the space 92 between the outer race 84 and the damper housing 88 (FIG. 2) via an opening 430. Although the damper housing 88 is not shown in FIG. 8 to enhance clarity of the lubricant retention and supply system 400, it may be appreciated that the lubricant retention and supply system 400 may be embodied within the damper housing 88 and/or may be provided in a separate housing that is fluidly coupled and attached to the damper housing 88. The lubricant is provided as a continuous flow through the space 92 and, thus, exits through opening 432 to passage 434 at flow $F_5$. The lubricant flows at $F_6$ to exit the lubricant retention and supply system 400 through the passage 452.

During operation, and when the valve assembly 402 is in the open position, lubricant is collected in the second chamber 445 of the reservoir 420 via the flow $F_3$ from the first chamber 417. As the lubricant collects, the force of the lubricant within the reservoir 420 acts against the piston 444 to move the piston 444 to position $P_1$. The collected lubricant will continue to fill the reservoir 420 until the piston 444 is at a full reservoir position $P_{11}$. In this manner, during flow $F_1$ of the lubricant, a supply of lubricant may also be stored within the reservoir 420, in addition to being provided to the space 92.

If the flow $F_1$ of lubricant through the passage 448 is interrupted or stopped, and referring now to FIG. 9, the force acting against the valve member 408 ceases. The first biasing member 414 then pushes against the piston head 412 to move the valve assembly 402 to the closed position. In the closed position, the valve member 408 is fitted within the valve seat 416. With no flow through the passage 448, lubricant present in the space 92 will exit the lubricant retention and supply system 400 via the passage 452. The lubricant that collected in the second chamber 445 during flow $F_1$ (FIG. 8) of lubricant through the passage 448 may now flow through the space 92. With no force of fluid from flow $F_3$ (FIG. 8) acting against the piston 444, the second biasing member 446 may move the piston 444 within the second chamber 445 to push the lubricant stored in the reservoir 420 into the first chamber 417 (as shown via flow $F_7$). The second biasing member 446 may be an air flow A provided from an air supply source (not shown). In some examples, the air flow A may be actuated when the lubricant flow ceases. In some examples, the air flow A may be constantly flowing such that the force of the flow $F_3$ in FIG. 8 acts against the air flow A to collect and pressurize lubricant in the second chamber 445. The air flow A of the second biasing member 446 moves the piston 444 along the second chamber 445 from the first position $P_1$ (FIG. 8), to an intermediate position $P_2$, where a portion of the lubricant stored in the reservoir 420 has been evacuated, to a final position $P_3$, where all lubricant stored in the reservoir 420 has been evacuated. The lubricant flows from the first chamber 417, through the passage 428 at flow $F_8$ and into the space 92 via the opening 430. The lubricant exits the space 92 through opening 432 and flows through passage 434 at flow $F_9$. The lubricant then flows out of the lubrication retention and supply system 400 at Flow $F_{10}$ via the passage 452. As the reservoir 445 has a finite space for which to store lubricant during the open operating position of FIG. 8, the supply of lubricant to the space 92 when the valve assembly 402 is in the closed position of FIG. 9 is temporary. Once all of the lubricant has evacuated from the reservoir 420 and the piston is in the position $P_3$, no further lubricant will be supplied to the space 92.

In other words, the lubricant retention and supply system of FIGS. 8 and 9 provides a system of supplying pressurized lubricant form a reservoir (e.g., reservoir 420) to the squeeze film damper (e.g., space 92) during a lubricant interruption condition. That is, during the lubricant supply condition (FIG. 8), a main valve (e.g., valve 402) is open and lubricant flows to the squeeze film damper (e.g., space 92) and to the reservoir 420. In the lubricant interruption condition (FIG. 9), the main valve (e.g., valve 402) is closed and oil is released from the reservoir 420 to the squeeze film damper. During operation, the lubricant reservoir (e.g., reservoir 340) is filled and the piston 444 is moved to one side (e.g., to the right in FIG. 8). During a lubricant interruption condition (e.g., FIG. 9), the lubricant in the reservoir 420 is released to the squeeze film damper (e.g., 94 in FIG. 2) in the space 92. The lubricant pressure is provided by the air flow A through the passage 446 provided by the engine. The reservoir 420 may be sized to the duration of the lubricant interruption condition. That is, the reservoir 420 may be sized such that there is lubricant to provide to the squeeze film damper (e.g., 94 in FIG. 2) in the space 92 for the entirety of the lubricant interruption condition.

Although not shown, in some examples, a constriction may be provided in the passage between the opening 424 and the reservoir 420. The constriction may slow the rate at which lubricant flows from the reservoir 420 to the squeeze film damper space 92 in the lubricant interruption condition of FIG. 9. This may prolong use of the bearing assembly with the squeeze film damper (FIG. 2, 94) in the space 92 by slowly flowing the lubricant into the space 92, thus, lengthening the use of the lubricant supply in the reservoir 420.

Features of any of the lubricant retention and supply systems of the present disclosure may be provided in any of the other lubricant retention and supply systems disclosed herein. For example, the pressurized systems of FIGS. 6 to 9 may be employed in FIGS. 3 and 4. For example, the recirculation path 242 of FIGS. 3 to 5 may be employed in the systems of FIGS. 6 to 9. Although FIGS. 3 to 5 are shown with a heat sink, the heat sink may be omitted. Alternatively, or additionally, the heat sink may be provided in any of the embodiments of FIGS. 6 to 9. Although not shown, a constriction may be provided in the exit passage 252, 352, 452. Such a constriction may slow the exit of the lubricant from the squeeze film damper in the space 92 and prolong the amount of time the bearing may continue to operate in a lubricant interruption condition. In some examples, a constriction may alternatively, or additionally, be supplied before the opening to the space 92 of the squeeze film damper (e.g., 94 in FIG. 2). This may slow the rate at which lubricant enters the squeeze film damper (FIG. 2, 94) and again prolong or increase the amount of time the bearing may continue to operate in a lubricant interruption condition.

The lubricant retention and supply systems of the present disclosure provide a system that includes a counter-balance biasing element, such as a spring, (e.g., FIG. 3, 214; FIG. 6, 314; FIG. 8, 414) to ensure that the valves are closed when the main lubricant flow pressure is below a threshold. This threshold is set by the spring force. During normal operation, the higher main lubricant flow pressure pushes the valve against the spring to open the valve and maintain the valve in the open position. In examples with a reservoir, the reservoir of the lubricant retention and supply system is filled with the high pressure oil simultaneously. As long as the main oil supply pressure is higher than this threshold, the valve is maintained open. If the main flow pressure drops to or below the threshold (e.g., a lubricant interruption condition), the biasing member, working with the previously higher-pressurized oil in the reservoir, will push back and close the valve. Thus, the reserved fluid in the reservoir will supplement to ensure the valve is closed. Since the reserved lubricant in the reservoir is always pressured with higher pressure fluid (from the main supply during normal operations), the reservoir will supplement the spring to keep the valve closed when the main flow pressure drops. If the main flow pressure is equal to the threshold for the entire duration of operation of the system (e.g., during operation of the engine), the valve may be maintained in a partially open or closed position. In such case, the main lubricant still flows into the damper since the oil still has the minimum pressure required.

The lubricant provided in the lubricant retention and supply systems of the present disclosure may be oil, although other lubricants or fluids are contemplated. The lubricant retention and supply systems of the present disclosure are shown in schematic form. Accordingly, the lubricant retention and supply systems may be integrated with the damper housing (e.g., damper housing 88 of FIG. 2) and/or may be provided separately and fluidly coupled to the space 92 (FIG. 2). In some examples, when the lubricant retention and supply systems are provided integral with the damper housing 88 (FIG. 2), the systems may be three-dimensionally (3D) printed and/or drilled within the damper housing 88 (FIG. 2). In some examples, when the lubricant retention and supply systems are provided separately, the lubricant retention and supply systems may be provided as tubes with a separate reservoir that are fluid coupled to the lubricant supply and squeeze film damper (e.g., space 92). In some examples, the passages are internal passages within the damper housing and other engine components. In some examples, the passages are external, separate passages, fluidly coupled with the lubricant system.

The lubricant retention and supply systems of the present disclosure may provide temporary supply of lubricant to the squeeze film damper in a lubricant interruption condition. In some examples, a reservoir that collects lubricant during the lubricant supply condition may be sized to accommodate an entire duration of the lubricant interruption condition.

The lubricant retention and supply systems of the present disclosure may mitigate the loss of lubricant to the squeeze film damper, thus allowing the damper to continue to produce damping during a temporary oil interruption and allowing a safe shutdown of an engine after an oil supply failure.

The lubricant retention and supply systems of the present disclosure provide a temporary continuous oil supply to the squeeze film damper in the event of a system supply interruption (e.g., lubricant interruption condition).

As is appreciated from the foregoing disclosure, an exit from the squeeze film damper is closed during a lubricant interruption condition such that the lubricant does not leave the squeeze film damper when the supply is interrupted. Additionally, the maximum temperature of the lubricant is limited in the squeeze film damper to maintain effective damping and to prevent oil coking. The operation of the damper generates heat in the lubricant, which is usually controlled by providing a continuous flow of lubricant through the damper. In the lubricant interruption condition of the present disclosure, however, such a continuous flow path may involve recirculation of the lubricant. Thus, the temperature may be limited (e.g., through use of a heat sink).

The lubricant retention and supply systems of the present disclosure are passively actuated systems. That is, when the pressure in the lubrication supply system drops (e.g., through supply oil or supply lubricant pressure drop), the valve closing device (e.g., biasing member 214 in FIG. 3) closes the valve either by spring force, pneumatic force, hydraulic force, or the like. Additionally, or alternatively, the lubricant retention and supply systems of the present disclosure may be actively actuated. That is, the system may include one or more sensors and one or more actuators communicatively coupled to the one or more sensors. When the supply pressure drops, the one or more sensors may detect the pressure drop and send a signal to the actuator. The actuator may in turn activate the valve closing device and/or the valve to close the valve. The actuator may be an electrical actuator, such as, for example, a servo motor. In some examples, the system may include both active and passive actuation.

Further aspects of the present disclosure are provided by the subject matter of the following clauses.

A lubricant supply system for a squeeze film damper includes a fluid passage configured to supply a lubricant to the squeeze film damper of a bearing assembly and a valve assembly configured to allow the fluid passage to move from the first flow path to the second flow path in response to an interruption of the first flow path. The fluid passage has a first flow path for lubricant into the lubricant supply system and into the squeeze film damper of the bearing assembly and a second flow path for lubricant into the squeeze film damper of the bearing assembly.

The lubricant supply system of the preceding clause, further including a heat sink in the fluid passage, wherein the heat sink is configured to reduce a temperature of lubricant along the second flow path.

The lubricant supply system of any preceding clause, wherein the valve assembly is configured to inhibit loss of lubricant from the second flow path.

The lubricant supply system of any preceding clause, further including a reservoir configured to store lubricant and a stop valve configured to fluidly isolate the reservoir from the first flow path when the valve assembly allows the first flow path and to fluidly connect the reservoir with the second flow path when the valve assembly allows the second flow path.

The lubricant supply system of any preceding clause, wherein eccentric orbit of a rotor of the bearing assembly is configured to recirculate lubricant in the second flow path.

The lubricant supply system of any preceding clause, further including a reservoir configured to store lubricant from the second flow path and a piston and a spring within the reservoir, the piston and the spring configured to pressurize the reservoir.

The lubricant supply system of any preceding clause, further including a reservoir configured to store lubricant, wherein the first flow path is configured to allow lubricant to flow from a main lubricant supply into the squeeze film damper and into the reservoir, and the second flow path is configured to allow lubricant to flow from the reservoir into the squeeze film damper.

The lubricant supply system of any preceding clause, wherein the valve assembly includes a first valve and a second valve, the first valve and the second valve laterally spaced from one another and coupled to a common valve stem such that the first valve and the second valve are configured to move simultaneously.

The lubricant supply system of any preceding clause, further including an air flow passage configured to pressurize the reservoir.

A gas turbine engine includes a bearing assembly configured to enable rotation of a shaft, a squeeze film damper configured to dampen a vibration caused by rotation of the bearing assembly, and a lubricant supply system. The lubricant supply system includes a fluid passage configured to supply a lubricant to the squeeze film damper of the bearing assembly, the fluid passage having a first flow path for lubricant into the lubricant supply system and into the squeeze film damper of the bearing assembly and a second flow path for lubricant into the squeeze film damper of the bearing assembly, and a valve assembly configured to allow the fluid passage to move from the first flow path to the second flow path in response to an interruption of the first flow path.

The gas turbine engine of the preceding clause, further including a heat sink in the fluid passage, wherein the heat sink is configured to reduce a temperature of lubricant along the second flow path.

The gas turbine engine of any preceding clause, wherein the valve assembly is configured to inhibit loss of lubricant from the second flow path.

The gas turbine engine of any preceding clause, further including a reservoir configured to store lubricant, and a stop valve configured to fluidly isolate the reservoir from the first flow path when the valve assembly allows the first flow path and to fluidly connect the reservoir with the second flow path when the valve assembly allows the second flow path.

The gas turbine engine of any preceding clause, wherein eccentric orbit of a rotor of the bearing assembly is configured to recirculate lubricant in the second flow path.

The gas turbine engine of any preceding clause, further including a reservoir configured to store lubricant from the second flow path, and a piston and a spring within the reservoir, the piston and the spring configured to pressurize the reservoir.

The gas turbine engine of any preceding clause, further including a reservoir configured to store lubricant, wherein the first flow path is configured to allow lubricant to flow from a main lubricant supply into the squeeze film damper and into the reservoir, and the second flow path is configured to allow lubricant to flow from the reservoir into the squeeze film damper.

The gas turbine engine of any preceding clause, wherein the valve assembly includes a first valve and a second valve, the first valve and the second valve laterally spaced from one another and coupled to a common valve stem such that the first valve and the second valve are configured to move simultaneously.

The gas turbine engine of any preceding clause, further including an air flow passage configured to pressurize the lubricant received in the reservoir.

The gas turbine engine of any preceding clause, wherein the bearing assembly includes a roller element bearing, an inner race, and an outer race, the roller element bearing configured to allow relative rotation of the shaft.

The gas turbine engine of any preceding clause, further including a damper housing, wherein the squeeze film damper is located between the outer race and the damper housing.

Although the foregoing description is directed to the preferred embodiments, it is noted that other variations and modifications will be apparent to those skilled in the art, and may be made without departing from the spirit or the scope of the disclosure. Moreover, features described in connection with one embodiment may be used in conjunction with other embodiments, even if not explicitly stated above.

The invention claimed is:

1. A lubricant supply system for a squeeze film damper, the lubricant supply system comprising:
    a fluid passage configured to supply a lubricant to the squeeze film damper of a bearing assembly, the fluid passage having:
        a first flow path for lubricant into the lubricant supply system and into the squeeze film damper of the bearing assembly; and
        a second flow path for lubricant into the squeeze film damper of the bearing assembly; and
    a valve assembly configured to allow the fluid passage to move from the first flow path to the second flow path in response to an interruption of the first flow path,
    wherein the lubricant supply system is provided within a damper housing or within a housing fluidly coupled to the damper housing.

2. The lubricant supply system of claim 1, further comprising a heat sink in the fluid passage, wherein the heat sink is configured to reduce a temperature of lubricant along the second flow path.

3. The lubricant supply system of claim 1, wherein the valve assembly is configured to inhibit loss of lubricant from the second flow path.

4. The lubricant supply system of claim 1, further comprising:
    a reservoir configured to store lubricant; and a stop valve configured to fluidly isolate the reservoir from the first flow path when the valve assembly allows the first flow path and to fluidly connect the reservoir with the second flow path when the valve assembly allows the second flow path.

5. The lubricant supply system of claim 1, wherein eccentric orbit of a rotor of the bearing assembly is configured to recirculate lubricant in the second flow path.

6. The lubricant supply system of claim 1, further comprising:
a reservoir configured to store lubricant from the second flow path; and
a piston and a spring within the reservoir, the piston and the spring configured to pressurize the reservoir.

7. The lubricant supply system of claim 1, further comprising a reservoir configured to store lubricant, wherein the first flow path is configured to allow lubricant to flow from a main lubricant supply into the squeeze film damper and into the reservoir, and the second flow path is configured to allow lubricant to flow from the reservoir into the squeeze film damper.

8. The lubricant supply system of claim 1, wherein the valve assembly includes a first valve and a second valve, the first valve and the second valve laterally spaced from one another and coupled to a common valve stem such that the first valve and the second valve are configured to move simultaneously.

9. The lubricant supply system of claim 1, further comprising a reservoir configured to store lubricant; and an air flow passage configured to pressurize the reservoir.

10. A gas turbine engine comprising:
a bearing assembly configured to enable rotation of a shaft;
a squeeze film damper configured to dampen a vibration caused by rotation of the bearing assembly; and
a lubricant supply system including:
a fluid passage configured to supply a lubricant to the squeeze film damper of the bearing assembly, the fluid passage having:
a first flow path for lubricant into the lubricant supply system and into the squeeze film damper of the bearing assembly; and
a second flow path for lubricant into the squeeze film damper of the bearing assembly; and
a valve assembly configured to allow the fluid passage to move from the first flow path to the second flow path in response to an interruption of the first flow path,
wherein the lubricant supply system is provided within a damper housing or within a housing fluidly coupled to the damper housing.

11. The gas turbine engine of claim 10, further comprising a heat sink in the fluid passage, wherein the heat sink is configured to reduce a temperature of lubricant along the second flow path.

12. The gas turbine engine of claim 10, wherein the valve assembly is configured to inhibit loss of lubricant from the second flow path.

13. The gas turbine engine of claim 10, further comprising:
a reservoir configured to store lubricant; and
a stop valve configured to fluidly isolate the reservoir from the first flow path when the valve assembly allows the first flow path and to fluidly connect the reservoir with the second flow path when the valve assembly allows the second flow path.

14. The gas turbine engine of claim 10, wherein eccentric orbit of a rotor of the bearing assembly is configured to recirculate lubricant in the second flow path.

15. The gas turbine engine of claim 10, further comprising:
a reservoir configured to store lubricant from the second flow path; and
a piston and a spring within the reservoir, the piston and the spring configured to pressurize the reservoir.

16. The gas turbine engine of claim 10, further comprising a reservoir configured to store lubricant, wherein the first flow path is configured to allow lubricant to flow from a main lubricant supply into the squeeze film damper and into the reservoir, and the second flow path is configured to allow lubricant to flow from the reservoir into the squeeze film damper.

17. The gas turbine engine of claim 10, wherein the valve assembly includes a first valve and a second valve, the first valve and the second valve laterally spaced from one another and coupled to a common valve stem such that the first valve and the second valve are configured to move simultaneously.

18. The gas turbine engine of claim 10, further comprising a reservoir configured to store lubricant; and an air flow passage configured to pressurize the lubricant received in the reservoir.

19. The gas turbine engine of claim 10, wherein the bearing assembly comprises a roller element bearing, an inner race, and an outer race, the roller element bearing configured to allow relative rotation of the shaft.

20. The gas turbine engine of claim 19, further comprising the damper housing, wherein the squeeze film damper is located between the outer race and the damper housing.

* * * * *